United States Patent
Miyamori (10) Patent No.: US 7,487,524 B2
(45) Date of Patent: Feb. 3, 2009

(54) METHOD AND APPARATUS FOR PRESENTING CONTENT OF IMAGES

(75) Inventor: Hisashi Miyamori, Tokyo (JP)

(73) Assignee: National Institute of Information and Communications Technology, Incorporated Administrative Agency, Tokyo (JP)

( * ) Notice: Subject to any disclaimer, the term of this patent is extended or adjusted under 35 U.S.C. 154(b) by 230 days.

(21) Appl. No.: 10/579,778

(22) PCT Filed: Nov. 19, 2003

(86) PCT No.: PCT/JP03/14722

§ 371 (c)(1),
(2), (4) Date: Dec. 7, 2006

(87) PCT Pub. No.: WO2005/050986

PCT Pub. Date: Jun. 2, 2005

(65) Prior Publication Data

US 2007/0074244 A1 Mar. 29, 2007

(51) Int. Cl.
H04N 5/44 (2006.01)
H04N 7/16 (2006.01)
H04N 7/25 (2006.01)
H04N 7/173 (2006.01)
H04N 7/10 (2006.01)
G06K 9/00 (2006.01)
G11B 27/00 (2006.01)

(52) U.S. Cl. ............... 725/34; 382/190; 382/100; 386/E5.042; 715/716

(58) Field of Classification Search ............ 382/190, 382/100; 725/34, 135; 715/135; 386/E5.042
See application file for complete search history.

(56) References Cited

U.S. PATENT DOCUMENTS 5,818,439 A 10/1998 Nagasaka et al.
5,903,264 A * 5/1999 Moeller et al. ............. 715/719

(Continued)

FOREIGN PATENT DOCUMENTS

EP 0 682 324 A2 11/1995

(Continued)

*Primary Examiner*—Samir A Ahmed
*Assistant Examiner*—Stephen R Koziol
(74) *Attorney, Agent, or Firm*—Birch, Stewart, Kolasch & Birch, LLP (57) ABSTRACT

The present invention is a method for presenting the content of images, in which, out of images that include at least moving images and can be segmented into a plurality of scenes, groups of two or more key images included in the individual scenes are extracted, and a digest screen of the images, which include the groups of key images, is organized. The method is characterized in that a scene segmenting step of generating individual segmented scenes and the following three steps for each scene are provided: a key-image extracting step, a preceding-and-following-key-image extracting step of extracting at least one still image time-oriented preceding the key image and/or at least one still image time-oriented following the key image, and a key-image weighting step of assigning a weight to the key image on the basis of a predetermined measure. Moreover, at least, a scene organizing step of disposing the preceding and following key images in the neighborhood of the corresponding key images, and enabling or disabling the display of the key images and expanding or contracting the key images according to the corresponding weights to organize a digest screen and a screen displaying step of displaying the digest screen are provided.

10 Claims, 7 Drawing Sheets

U.S. PATENT DOCUMENTS

| | | | |
|---|---|---|---|
| 6,246,803 B1 * | 6/2001 | Gauch | 382/276 |
| 6,289,361 B1 * | 9/2001 | Uchida | 715/201 |
| 6,338,094 B1 * | 1/2002 | Scott et al. | 709/245 |
| 6,882,793 B1 * | 4/2005 | Fu et al. | 386/95 |
| 2002/0114615 A1 | 8/2002 | Tojo et al. | |

FOREIGN PATENT DOCUMENTS

| | | |
|---|---|---|
| JP | 10-232884 A | 9/1998 |
| JP | 2001-306599 A | 11/2001 |

\* cited by examiner

METHOD AND APPARATUS FOR PRESENTING CONTENT OF IMAGES

TECHNICAL FIELD

The present invention relates to a method and an apparatus for processing images, and in particular, relates to a method and an apparatus for presenting the content of images to organize digest images that efficiently convey the content of images on the basis of the images that include moving images and can be segmented into multiple scenes.

BACKGROUND ART

Recently, with the development of information and communications technology including the Internet, image content such as digital image information in various types of field has rapidly increased.

Image content can be viewed with, for example, a web browser. The images may be viewed after files are downloaded from a server that stores the images. Alternatively, the images may be viewed with, for example, a suitable web browser while the images are simultaneously being received from a streaming server.

In either case, the image content to be distributed is time-oriented data. Thus, the image content needs to be fast-forwarded or rewound on browsing software such as a web browser in order to find or check a necessary part of the images.

In the former case, the images need to be downloaded all at once. Thus, even a part of the images cannot viewed until the files have been completely received even when a broadband connection that has been recently spread is used. On the other hand, in the latter case, the images can be viewed upon storing a predetermined amount of images in a buffer. However, when images that start from a predetermined time are viewed, the images must be again stored in the buffer.

Thus, a problem exists, in that it is time-consuming and cumbersome to check the content of images. Accordingly, hitherto, two main techniques have been studied for checking the outline of images.

A first technique is a technique for presenting images on a web page in a clear way. For example, an interface has been proposed, in which contracted image segments and text information are provided side by side on the web and the thumbnail images are expanded so as to seamlessly reproduce the original images.

A second technique is a technique for generating and reproducing a digest of images within a specified period of time. For example, a method for generating a digest depending on the purpose by assigning indexes, for example, tied score, come-from-behind win, and walk-off win, directly to images in the case of sports images and a method for generating a digest using an automatic indexing technique are known.

In addition to these techniques, individual elemental techniques have been studied, for example, a method for having a grasp of story, a method for selecting individual important scenes, and a method for generating a digest.

For example, a method is disclosed in International Publication No. WO00/17778, for generating index images in various forms using a video browser technique, in which the index images is still images that represent the content of moving images in a condensed form. Moreover, an image displaying apparatus and a method is disclosed in International Publication No. WO00/17779, for having a proper grasp of the content of fast moving images or moving image including short scenes which is hard to grasp only with the aforementioned index images. This method is supposed to enable playback from the scene that a user wishes to watch.

Moreover, a system for extracting information that is used to retrieve moving image content and the like are disclosed in Japanese Unexamined Patent Application Publication No. 2002-335473. In this system, a piece of moving image content on the Internet is split into scenes, a representative still image is selected from each scene to create a thumbnail image, and then the created thumbnail image is stored in a moving-image retrieval information database.

Moreover, an apparatus and a method for viewing digital image content are disclosed in Japanese Unexamined Patent Application Publication No. 2001-309269, in which pieces of image content distributed through digital broadcasting are each split into segments where each segment represents a channel, a program, or a predetermined period of time, groups of icons corresponding to the segments are classified and arranged to be located at predetermined positions, and an image content segment can be displayed by viewing this arrangement from the corresponding view point.

DISCLOSURE OF INVENTION

In view of the conventional art, the present invention provides the following means.

The invention according to Claim 1 is a method for presenting the content of images, in which, out of images that include at least moving images and can be segmented into a plurality of scenes, groups of two or more key images included in the individual scenes are extracted, and a digest screen of the images which includes the groups of key images, is organized. The method includes, at least:

(1) a scene segmenting step of segmenting the images into individual scenes with scene segmenting means, after the following (2) to (4) steps for each scene in step (1), (2) a key-image extracting step of extracting a still image which is made a key image at a point of time from each scene with key-image selecting means, (3) a preceding-and-following-key-image extracting step of extracting at least one still image time-oriented preceding the key image and/or at least one still image time-oriented following the key image from each scene with preceding-and-following-key-image selecting means, (4) a key-image weighting step of assigning a weight to the key image in each scene on the basis of a predetermined measure with key-image weighting means, (5) a scene organizing step of, with scene organizing means, disposing the key images in the individual scenes in time-oriented order, expanding or contracting the key images according to the corresponding weights, and organizing a digest screen on which the preceding and following key images can be disposed in the neighborhood of the corresponding key images, and (6) a screen displaying step of displaying the digest screen with screen displaying means.

The invention according to Claim 2 is characterized in that, in the key-image weighting step, the key-image weighting means may further assign weights to the individual preceding and following key images on the basis of the predetermined measure, and, in the scene organizing step, the scene organizing means, according to the corresponding weights, may enable or disable the display of the preceding and following key images and may expand or contract the preceding and following key images when the preceding and following key images are to be displayed to organize the digest screen.

In the invention according to Claim 3, the following steps may be provided so that the details of scenes that include specified key images can be viewed.

(A) a detailed-key-image extracting step of, with the key-image selecting means, in a case where key images or preceding and following key images are specified through the digest screen, extracting as detailed key images at least two still images from scenes that include the specified key images or preceding and following key images, (B) a preceding-and-following-detailed-key-image extracting step of extracting at least one still image time-oriented preceding each detailed key image and/or at least one still image time-oriented following each detailed key image with the preceding-and-following-key-image selecting means, and (C) a detailed-key-image weighting step of assigning weights to the detailed key images on the basis of a predetermined measure with the key-image weighting means.

After the detailed key images are extracted, the following steps may be performed: the scene organizing step, in which, with the scene organizing means, the preceding and following detailed key images are disposed in the neighborhood of the corresponding detailed key images while the detailed key images in the scenes are disposed in time-oriented order, and the detailed key images are expanded or contracted according to the corresponding weights to organize a new digest screen, and the screen displaying step, in which the new digest screen is displayed with the screen displaying means.

Moreover, the invention according Claim 4, in addition to the aforementioned methods, provides a method for presenting the content of images, in which, in the detailed-key-image weighting step, the key-image weighting means may further assign weights to the individual preceding and following detailed key images on the basis of the predetermined measure, and, in the scene organizing step, the scene organizing means may expand or contract the preceding and following detailed key images according to the corresponding weights to organize the digest screen.

Moreover, in the invention according Claim 5, a text defining step of, for the key image and the preceding and following key images or the detailed key images and the preceding and following detailed key images in the individual scenes, defining texts related to the corresponding still images or the scenes that include the corresponding still images with text defining means may be provided. In the scene organizing step, the texts may be expanded or contracted on the basis of a predetermined measure, and then the digest screen may be organized with the texts and the corresponding still images.

The present invention can provide the following apparatus for presenting the content of images. That is to say, an apparatus according to Claim 6 includes, at least, means for inputting the images, scene segmenting means for segmenting the images into individual scenes, key-image selecting means for extracting a still image which is made a key image at a point of time, preceding-and-following-key-image selecting means for extracting at least one still image time-oriented preceding the key image and/or at least one still image time-oriented following the key image, key-image weighting means for assigning a weight to the key image on the basis of a predetermined measure, scene organizing means for disposing the key images in the individual scenes in time-oriented order, expanding or contracting the key images according to the corresponding weights, and organizing a digest screen on which the preceding and following key images can be disposed in the neighborhood of the corresponding key images, and screen displaying means for displaying the digest screen.

The apparatus for presenting the content of images according to Claim 7 is characterized in that the key-image weighting means may further assign weights to the individual preceding and following key images on the basis of the predetermined measure, and the scene organizing means, according to the corresponding weights, may enable or disable the display of the preceding and following key images and may expand or contract the preceding and following key images when the preceding and following key images are to be displayed to organize the digest screen.

In the invention according to Claim 8, key-image specifying means for specifying key images or preceding and following key images through the digest screen may be provided. The key-image selecting means may extract as detailed key images at least two still images from scenes that include the specified key images or preceding and following key images, the preceding-and-following-key-image selecting means may extract at least one still image time-oriented preceding each detailed key image and/or at least one still image time-oriented following each detailed key image, and the key-image weighting means may assign weights to the detailed key images on the basis of a predetermined measure.

On the basis of the detailed key images, the preceding and following detailed key images, and the corresponding weights, which are determined in the aforementioned way, the scene organizing means may dispose the preceding and following detailed key images in the neighborhood of the corresponding detailed key images while disposing the detailed key images in the scenes in time-oriented order, and may expand or contract the detailed key images according to the corresponding weights to organize a new digest screen, and the screen displaying means may display the new digest screen.

The invention according to Claim 9 provides an apparatus for presenting the content of images, in which the key-image weighting means may further assign weights to the individual preceding and following detailed key images on the basis of the predetermined measure, and the scene organizing means may expand or contract the preceding and following detailed key images according to the corresponding weights to organize the digest screen.

The invention according to Claim 10 is characterized in that text defining means, for the key image and the preceding and following key images or the detailed key images and the preceding and following detailed key images in the individual scenes, for defining texts related to the corresponding still images or the scenes that include the corresponding still images may be provided, and the text defining means may expand or contract the texts on the basis of a predetermined measure and then may organize the digest screen with the texts and the corresponding still images.

REFERENCE NUMERALS

10 step of scene segmentation
11 step of extraction of key image
12 step of extraction of preceding and following key images
13 step of assignment of weight to key image
14 step of image organization
15 step of display of images on screen

BEST MODE FOR CARRYING OUT THE INVENTION

Embodiments according to the present invention will now be described with reference to the drawings. Embodiments according to the present invention are not limited to those described below and can be changed as necessary.

Figure 1:
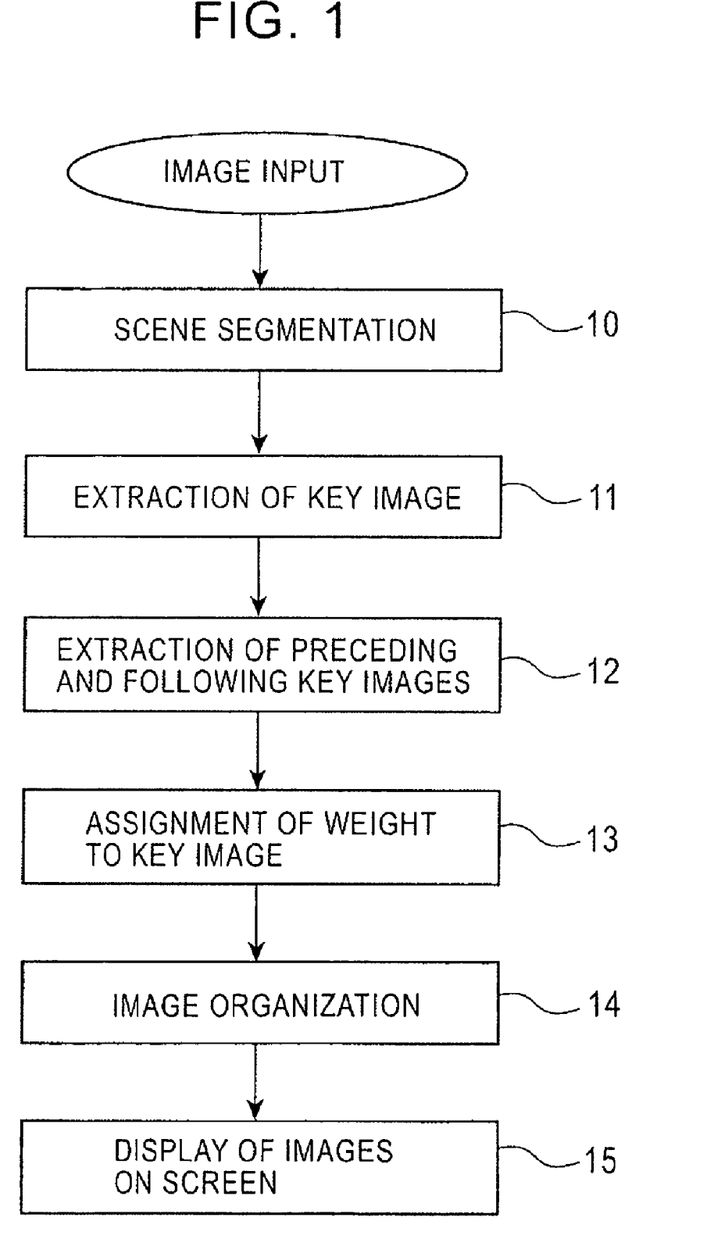
FIG. 1 is a process flowchart of a method for presenting the content of images according to the present invention.
Figure 2:
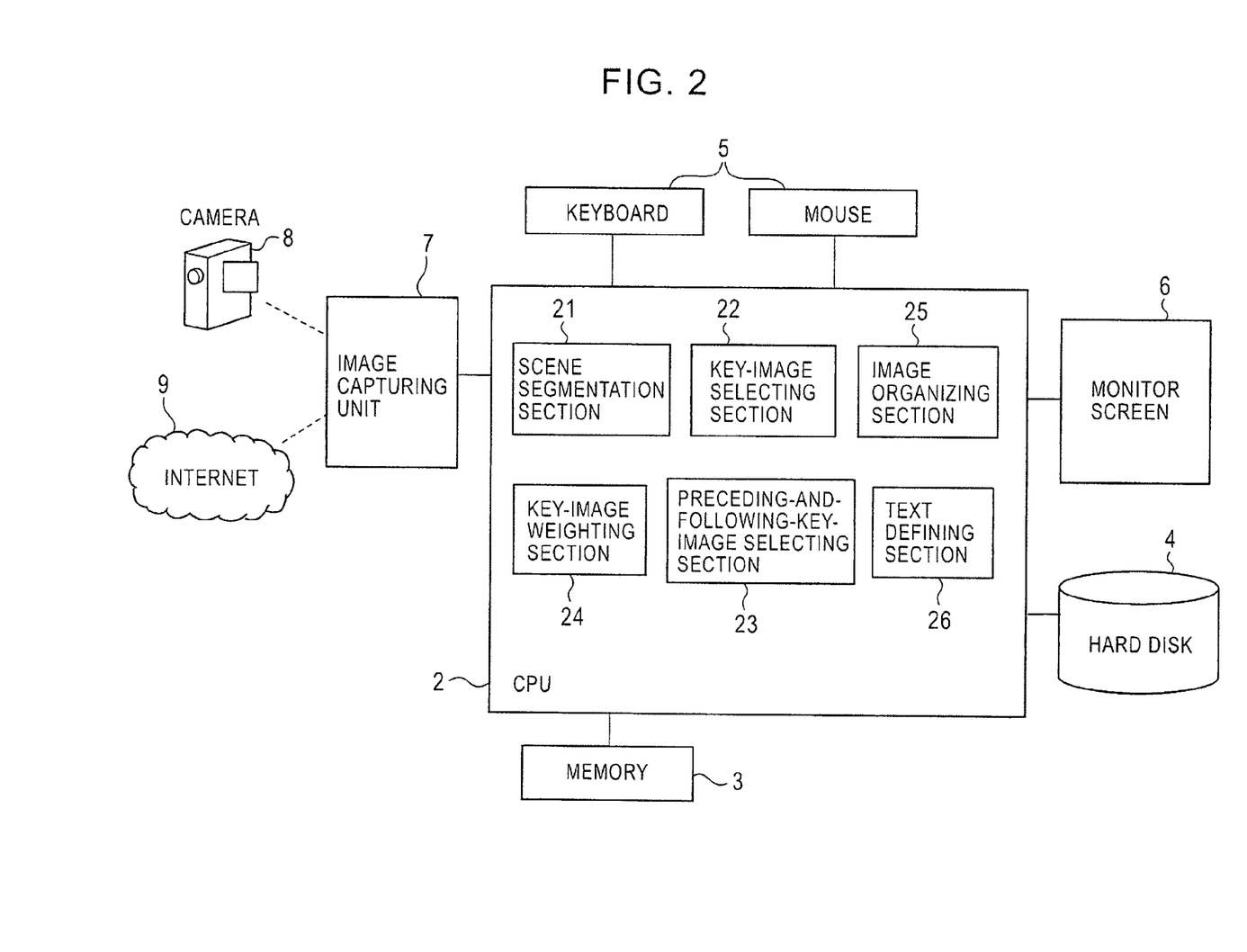
FIG. 2 is a block diagram of an apparatus for presenting the content of images according to the present invention.

FIG. 1 shows a flowchart of a method for presenting the content of images according to the present invention. FIG. 2 shows the structure of an apparatus for presenting the content of images according to the present invention.

First Embodiment

The apparatus 1 for presenting the content of images can be constituted of a known personal computer and includes a CPU 2 that performs arithmetic processing, a memory 3 composed of a RAM and a ROM, an external storage unit 4 such as a hard disk, input unit 5 such as a keyboard and a mouse, a monitor 6 that displays output, and the like.

Moreover, in the apparatus 1, an image capturing unit 7 to insert images is connected to the CPU 2 and records on the external storage unit 4 image signals from, for example, a video camera 8 and an image distribution server 9 on the Internet. In the present invention, it is assumed that captured image signals are time-oriented data and a still image at certain time can be extracted from the image signals by a known image processing method.

In step 10, images that are captured by the image capturing unit 7 are subjected to scene segmentation process in a scene segmentation section 21 in the CPU 2 by a known method, as shown in FIG. 1. A scene means a series of images that have an independent meaning and is separated from other scenes, for example, at a point where the camera angle changes or the subject changes or at a break point in time.

In the scene segmentation process, a user may directly specify break points between scenes with the input unit 5 while displaying images on the monitor. Alternatively, a method for automatically performing scene segmentation may be used: for example, a method based on color variation, in which a histogram of a certain image and the preceding image in a segment of images is generated, and scene segmentation is performed when the absolute value of the difference between these images is equal to or more than a threshold value, or a method for detecting break points by comparing the feature values of individual successive images (Japanese Unexamined Patent Application Publication No. 3-214364).

Moreover, more accurate scene segmentation can be performed by a technique disclosed in, for example, Japanese Unexamined Patent Application Publication No. 6-333048 or 2003-244628.

The individual segmented scenes are stored in the external storage unit 4.

Then, in step 11, in a key-image selecting section 22, the individual scenes are read out from the external storage unit 4, and a key image is extracted from each scene. It is preferable that the key image be a still image that most appropriately represents each scene. The still image can be extracted from moving images as a frame or a picture.

In the case where key images are extracted from the individual scenes, the user may specify the individual key images with the input unit 5 to store the corresponding still images in the external storage unit 4, or the key images may be automatically extracted.

Any known method can be used as the method for automatically extracting key images from individual scenes. For example, a method for extracting frames that are closest to the centers of time frames of individual scenes as key images and a method for extracting the leading frames of individual scenes as key images are methods for extracting key images without complicated processing. Moreover, a method for extracting as a key image a frame that has a color histogram that is closest to the average of the color histograms of individual frames in the corresponding scene is also appropriate.

Moreover, an important scene can be selected from a plurality of scenes. In this case, weight setting is performed on the individual scenes. The following methods are suitable as the methods for weight setting: for example, a method for weight setting, in which the weight to be assigned to a scene increases as the length of the scene becomes longer and as the degree of similarity between the scene and other scenes decreases, and another method for weight setting, in which the time-oriented variation of semantic indexes assigned to scenes (for example, a change in score and the occurrence of events at points of time in sports images) is analyzed to grasp the story of entire images to some degree and then the weights of the scenes are determined.

Then, in step 12, in a preceding-and-following-key-image selecting section 23, still images each time-orientedly preceding and following each of the key images extracted by the key-image selecting section 22 in the corresponding scene are extracted as preceding and following key images. The extracted preceding and following key images are also stored in the external storage unit 4.

In these steps, for each scene, a key image that represents the scene and preceding and following key images each preceding and following the key image are extracted.

In the present invention, in step 13, weights related to the degrees of importance of the key images and the preceding and following key images are assigned to these images in a key-image weighting section 24 in the CPU 2. The term "degree of importance" represents the degree of importance of the corresponding still image in the entire images. The user defines the degree of importance through the input unit 5. For example, the case of images captured in a baseball game will now be described, assuming that a scene where a home run was hit exists in the entire images of the game. In the scene, a first image at the time when the home run was hit is the representative image and is regarded as the key image, and a second image at the time when a batter stepped into the batter box and a third image after the home run was hit are regarded as the preceding key image and the following key image, respectively. When it is determined that the first image where the home run was hit is very important in this game, for example, the user assigns a weight of 5 on a five-grade evaluation scale to the first image.

Figure 3:
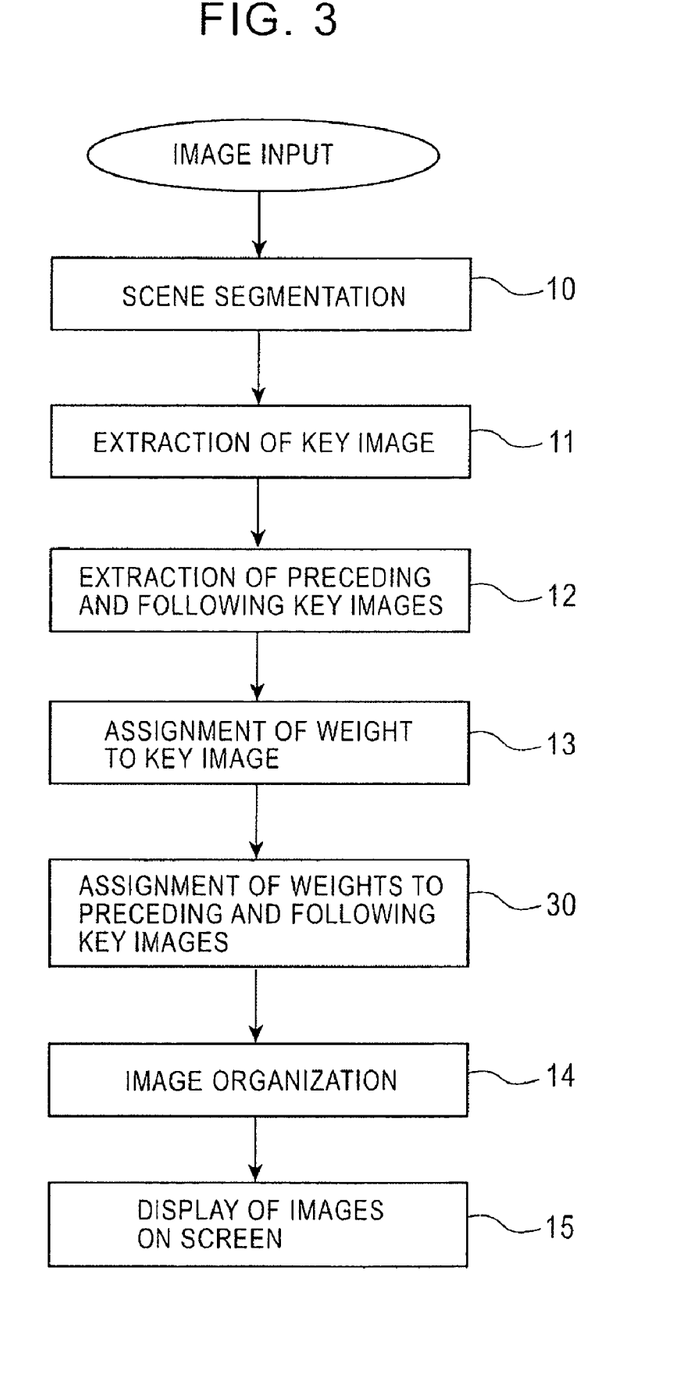
FIG. 3 is a process flowchart according to a first embodiment of the present invention.

Moreover, in the present invention, step 30 of assigning weights to preceding and following key images may be added after step 13 of assigning a weight to a key image, as shown in FIG. 3. In step 30, in the key-image weighting section 24, weights are assigned to the preceding and following key images in the same way as described above to organize digest images.

That is to say, when the first scene of the home run is very important, a weight of 3 is assigned to the preceding and following key images. Moreover, in a scene where a hit was made, for example, weights of 4 and 2 may be assigned to the corresponding key image and the corresponding preceding and following key images, respectively.

In the arrangement in which key images are automatically extracted using, for example, the corresponding feature values in step 11 of extracting key images, such weight assignment may be automatically performed on the basis of, for example, the feature values. Such a technique is known in, for example, a method for extracting representative images.

Then, the process proceeds to step 14 that is a main step in the present invention where image organization process is performed. This process is performed by an image organizing section 25 in the CPU 2.

Figure 5:
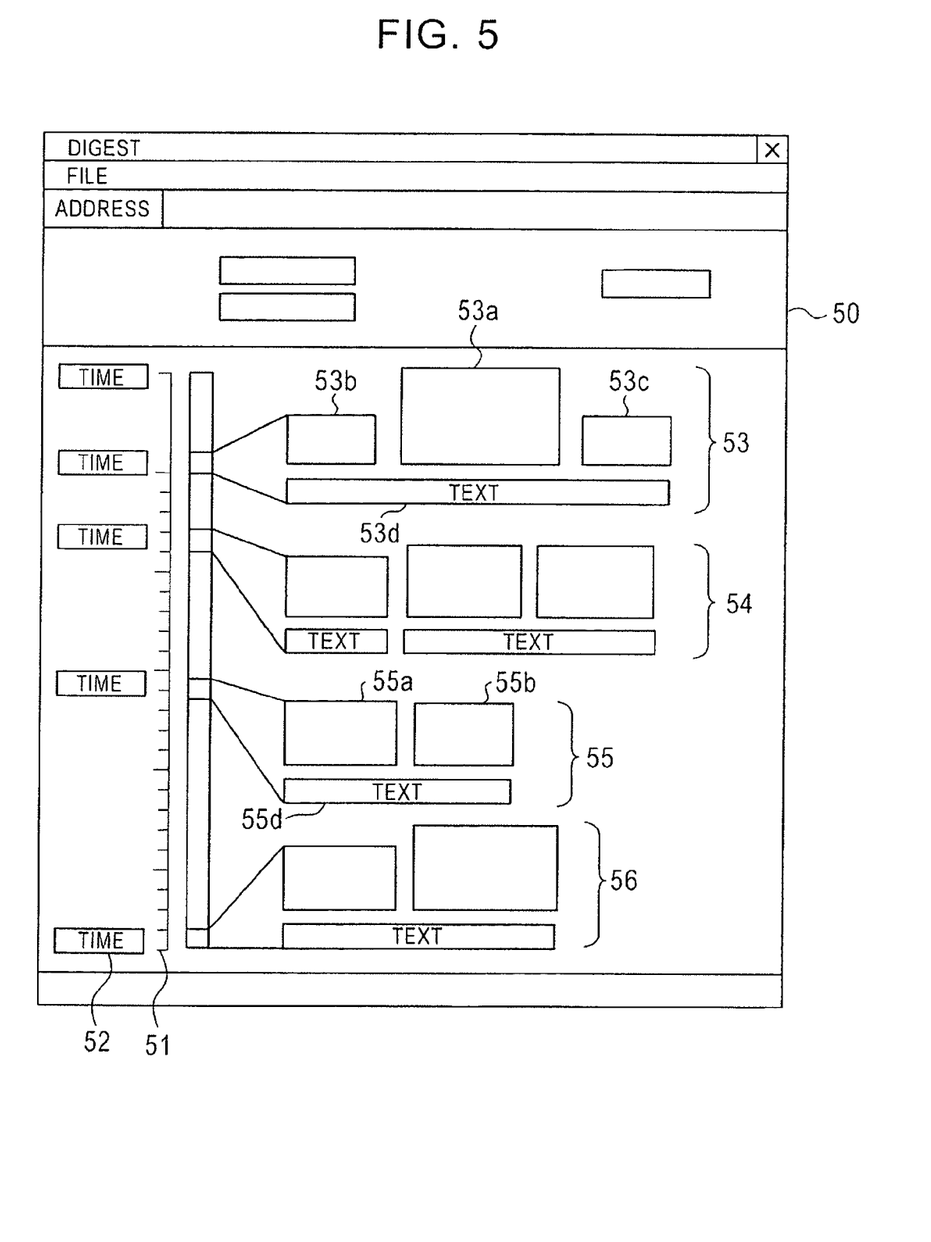
FIG. 5 shows a screen for presenting the content of image according to the present invention.

The present invention provides a method for presenting the content of images that has not been provided. In the present invention, a digest screen 50 shown in FIG. 5 is displayed on the monitor 6 on the basis of the key images, the preceding and following key images, and the weights assigned to these images.

A time line 51 that extends downward so as to represent the time-oriented order is disposed on the left area of the digest screen, and times 52 of individual images are displayed on columns on the left side of the time line 51. The times 52 may represent elapsed time from the start time of the images, the start time being set to zero, or absolute time when the images were captured.

Then, the time line is divided so as to correspond to individual scenes, and key images and preceding and following key images corresponding to scenes 53, 54, 55, and 56 to which large weights are assigned are disposed on the right side of the time line 51.

At this time, the sizes of the key images and the preceding and following key images are increased or decreased according to the result of the weight assignment, which characterizes the present invention. For example, in the scene 53, a key image 53a is expanded to a thumbnail image of the largest size according to the weight of 5, and a preceding key image 53b preceding the key image 53a and a following key image 53c following the key image 53a are displayed in a reduced size according to the weights of 2 and 1, respectively.

In the present invention, both of the preceding and following key images need not always be extracted. Thus, when it is determined as the result of the weight assignment that these images are not important, a weight of 0 may be assigned to these images so that these images are not displayed. This case is applicable to the scene 55. In the case of the scene 55, a preceding key image is not displayed, and a key image 55a having a weight of 4 and a following key image 55b having a weight of 3 are expanded and contracted to be displayed, respectively. The arrangement for determining whether preceding and following key images are to be displayed is not limited to the arrangement in which preceding and following key images are not displayed only when the weights of these images are zero, and an arrangement in which preceding and following key images are not displayed when the weights of these images are equal to or less than a predetermined threshold value or an arrangement in which preceding and following key images are displayed only when the weights of these images are equal to or more than a threshold value may be adopted.

As described above, the present invention is characterized in that images are segmented into scenes, key images and preceding and following key images are extracted from the scenes, weights are assigned to these images according to the degrees of importance of these images, the key images and the preceding and following key images are disposed in time-oriented order at the image organizing section 25, and the key images and the preceding and following key images are displayed or not displayed and are expanded or contracted according the weights of these images. As a result, an appropriate scene can be quickly selected from images. Moreover, important scenes are displayed in an increased size. Thus, a method for presenting the content of images can be provided, in which the user can readily have a grasp of the content of images.

Any measure can be used to represent the degree of importance, and the degree of importance can be appropriately set in response to the content of images. For example, in sports images, on a digest screen that mainly represents the progress of a game, a high degree of importance needs to be assigned to a scene where, for example, a nice play or an error was made. In this case, when, for example, the facial expressions of players and the atmosphere created by the attendance need to be conveyed, scenes that represent these situations are important. Thus, the degree of importance depends on the setting processes that are performed by the user or the automatic processes in the key-image selecting section 22 and the key-image weighting section 24.

In step 15, the digest screen 50 organized by the image organizing section 25 is displayed on the monitor 6.

Second Embodiment

Figure 4:
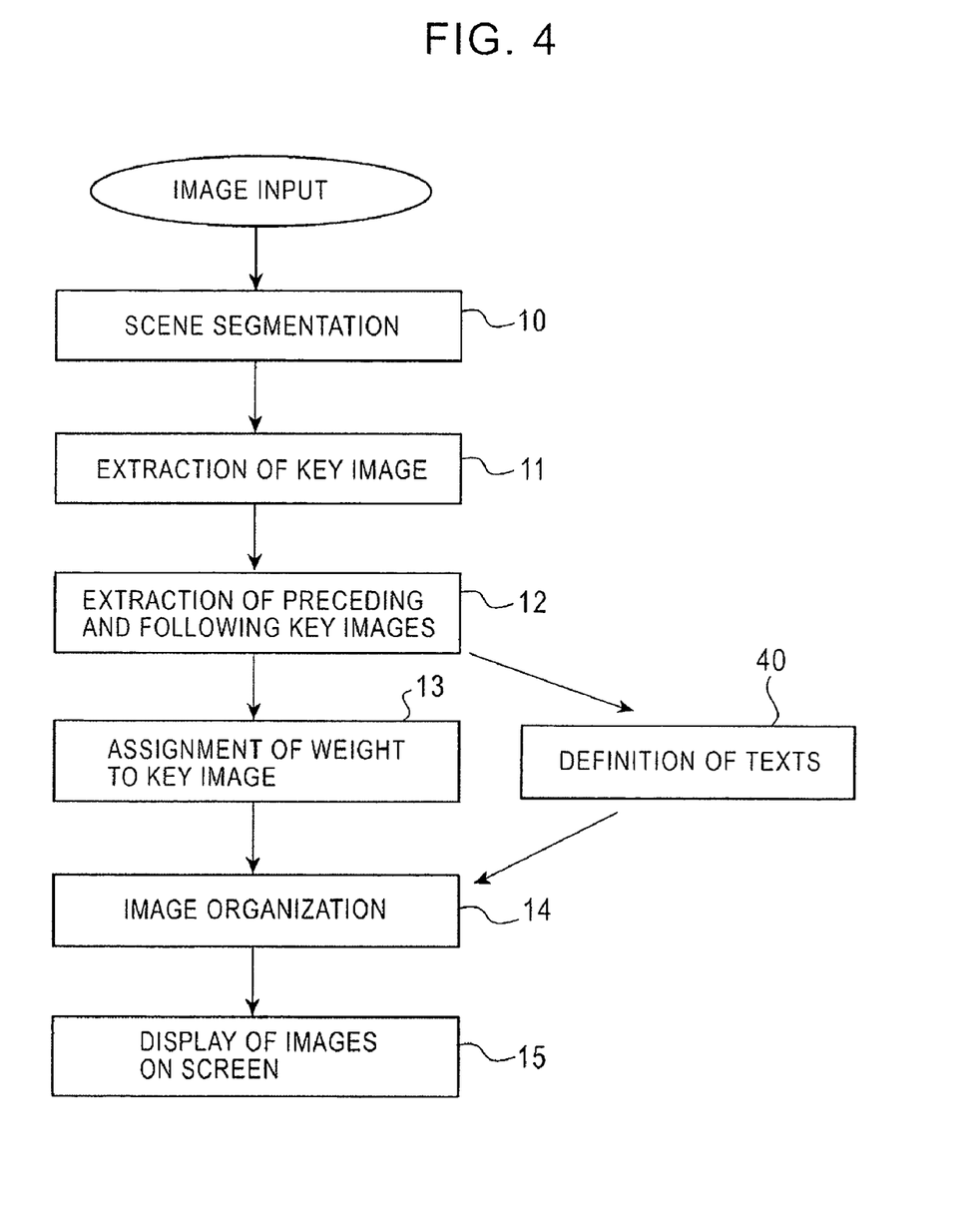
FIG. 4 is a process flowchart according to a second embodiment of the present invention.

In the present invention, in addition to the aforementioned first embodiment, the following arrangement may be added. FIG. 4 shows this process. That is to say, after step 12 of extracting preceding and following key images, while weight assignment is performed in step 13 of assigning weights to key images, texts that describe the key images and the corresponding preceding and following key images may be defined in a text defining section 26 in the CPU 2 in step 40. The user may input these texts through the input unit 5. Alternatively, when texts corresponding to times are assigned to images in advance, these texts may be automatically defined as the aforementioned texts. The closed caption technique that adds caption information to images is known as an example of the latter case. When the closed caption information is used, the text defining section 26 reads out the information and assigns the information to a scene or a still image that is being displayed. The defined texts, together with the scene or the still image, are stored in the external storage unit 4.

Then, in the image organizing section 25, when still images are read out from the external storage unit 4, the corresponding texts are also read out. Then, for example, texts 53d and 55d are respectively inserted in a part just under the key images 53a, 53b, and 53c and a part just under the key images 55a and 55b on the digest screen 50.

Thus, in a case where the user views still images, even when the still images are illegible because the still images are thumbnail images, the user can readily have a grasp of the content of images. This contributes to the method for efficiently presenting the content of images.

Moreover, texts can be displayed in an increased or reduced size as necessary. For example, weights are assigned to individual texts in advance, and then the texts can be displayed with characters having been expanded or contracted according to the weights of the individual texts. Alternatively, the texts can be displayed in an increased or reduced size according to the weights of the corresponding key images.

Third Embodiment

Figure 6:
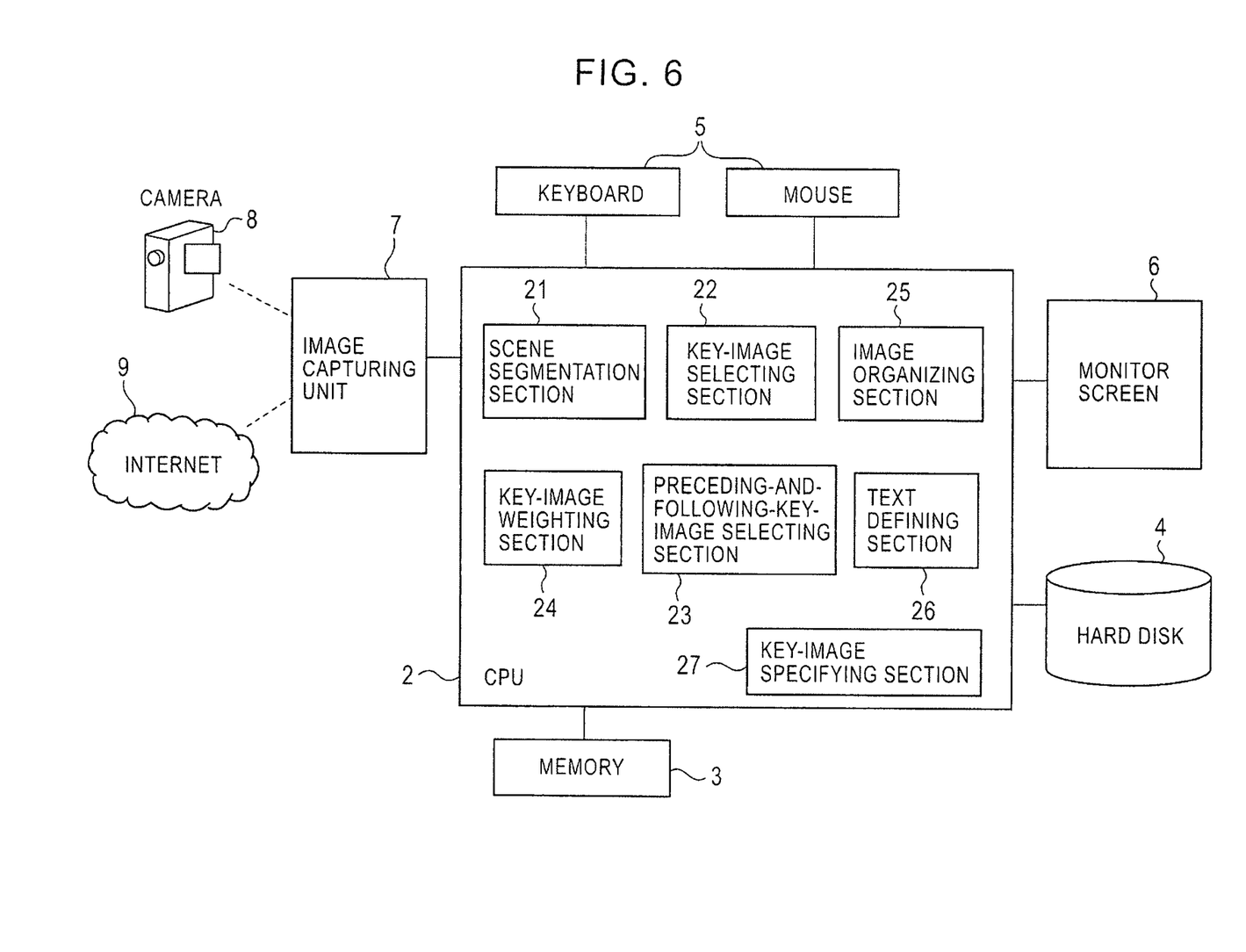
FIG. 6 is a block diagram of an apparatus for presenting the content of images according to a third embodiment of the present invention.

In the present invention, a key-image specifying section 27 may be provided, as shown in FIG. 6, so that, in a case where the user specifies key images or preceding and following key images through the input unit 5 at the time of viewing images, the details of the corresponding scenes that include these key images can be displayed.

In this case, when key images are selected by the key-image selecting section 22 after scene segmentation is performed by the scene segmentation section 21 in the first embodiment, second, third, and so forth detailed key images that represent the corresponding scenes are extracted and stored in the external storage unit 4. When this operation is manually performed, the most representative image in one scene is selected as the key image, and other representative images are selected as the detailed key images. When this operation is automatically performed, for example, an image that has the highest feature value is selected as the key image, and other images that have feature values that are equal to or more than a predetermined threshold value are selected as the detailed key images.

Moreover, in the preceding-and-following-key-image selecting section 23, corresponding images are defined as preceding and following detailed key images for the individual detailed key images in the similar way as described above.

In the key-image weighting section 24, weights are assigned to these detailed key images and preceding and following detailed key images and stored in the external storage unit 4. At this time, descriptive texts may be defined in the text defining section 26 as necessary.

As a result of the aforementioned processing, when the user specifies key images through the key-image specifying section 27, the image organizing section 25 reorganizes detailed images and preceding and following detailed images in the corresponding scenes according to the weights of these images in the similar way as described above, and then the reorganized digest screen 50 is displayed on the monitor 6.

Figure 7:
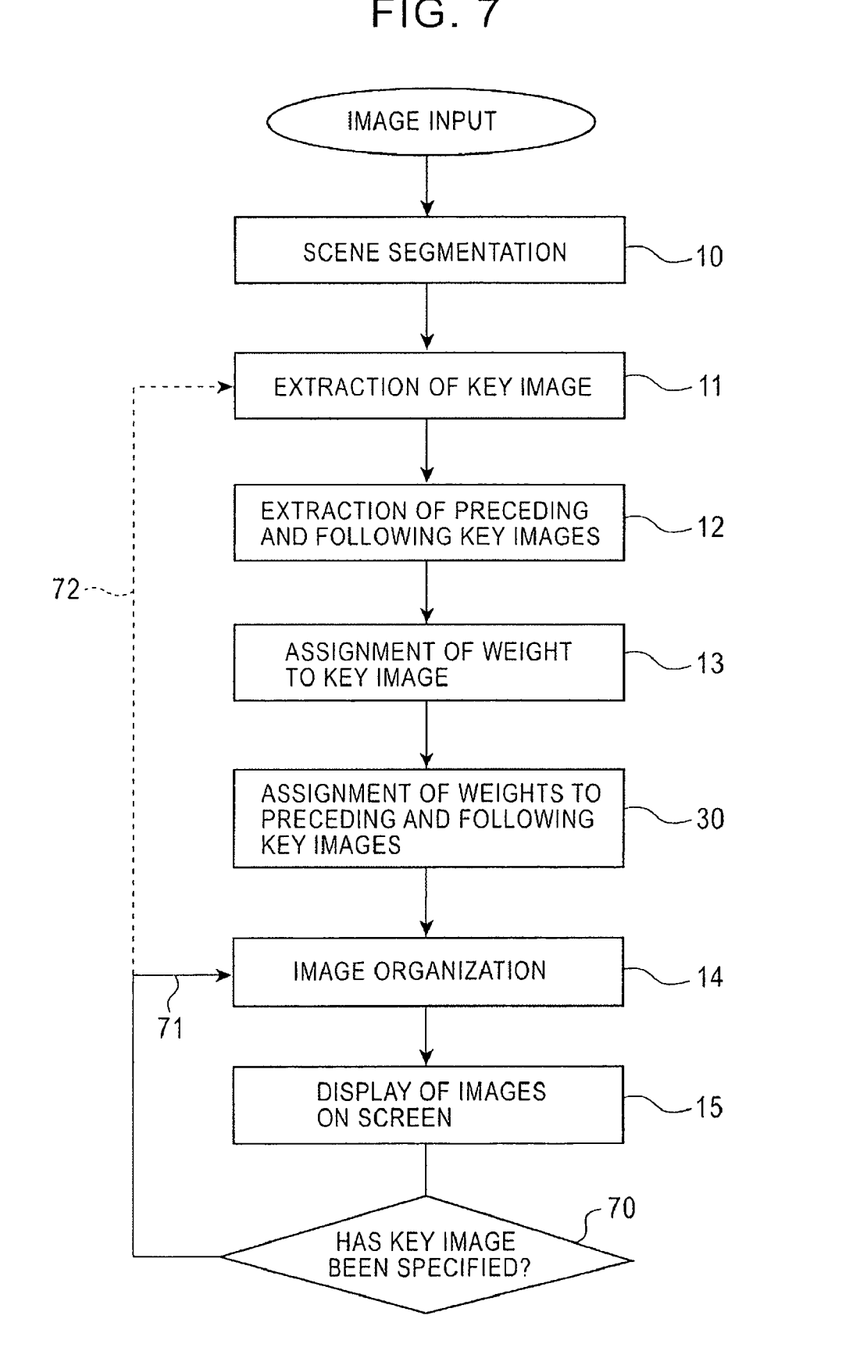
FIG. 7 is a process flowchart according to a third embodiment of the present invention.

The process described above is a process in which detailed key images and the like are defined in advance. As shown in FIG. 7, in the process described above, in a case where it is determined in step 70 that key images have been specified, the process proceeds to step 14 where image organization is performed, as indicated by a flow 71. On the other hand, in a case where the whole process from step 11 where key images are extracted to step 30 where weights are assigned to preceding and following key images is automatically performed, after it is determined in step 70 that key images have been specified, step 11 of extracting key images, step 12 of extracting preceding and following key images, step 13 of assigning weights to key images, and step 30 of assigning weights to preceding and following key images may be again performed by the CPU 2 in the corresponding scenes, as indicated by a flow 72, and the screen may be reorganized. In this case, detailed key images and preceding and following detailed key images can be extracted by changing a threshold value for feature values, as described above.

In these processes, the detailed key images out of images around the corresponding time may be displayed by specifying a predetermined portion of the time line 51 through the input unit 5, instead of specifying key images and the like.

Moreover, in the method according to the third embodiment, key images and detailed key images may be stored with a hierarchical structure in the external storage unit 4 so that detailed key images are displayed when the detailed key images are selected. Then, detailed images may be viewed by the user as necessary in response to the user's specification. According to this method, the user can specify scenes out of entire images while viewing key images and the like and can further view detailed images in one scene.

The present invention provides an interface that enables a quick grasp of the outline of the content of images and a quick grasp of interesting individual scenes at a required level of detail, as described above.

The present invention is characterized in that, in order to enable these advantages, a plurality of key images that represent a predetermined meaning of a certain scene and a plurality of descriptive texts can be presented as a single unit and a time line and the levels of detail of these units can be changed as necessary.

The invention claimed is:

1. A method for presenting the content of images, in which, out of images that include at least moving images and can be segmented into a plurality of scenes, groups of two or more key images included in the individual scenes are extracted, and a digest screen of the images which includes the groups of key images, is organized, the method comprising, at least:

a scene segmenting step of segmenting the images into individual scenes with scene segmenting means, and for each scene the following three steps are provided, a key-image extracting step of extracting a still image which is made a key image at a point of time from each scene with key-image selecting means, a preceding-and-following-key-image extracting step of extracting at least one still image time-oriented preceding the key image and/or at least one still image time-oriented following the key image from each scene with preceding-and-following-key-image selecting means, and, a key-image weighting step of assigning a weight to the key image in each scene on the basis of a predetermined measure with key-image weighting means;

a scene organizing step of, with scene organizing means, disposing the key images in the individual scenes in time-oriented order, expanding or contracting the key images according to the corresponding weights, and organizing a digest screen on which the preceding and following key images can be disposed in the neighborhood of the corresponding key images; and a screen displaying step of displaying the digest screen with screen displaying means.

2. The method according to claim 1, wherein, in the key-image weighting step, the key-image weighting means further assigns weights to the individual preceding and following key images on the basis of the predetermined measure, and, in the scene organizing step, the scene organizing means, according to the corresponding weights, enables or disables the display of the preceding and following key images and expands or contracts the preceding and following key images when the preceding and following key images are to be displayed to organize the digest screen.

3. The method according to claim 1 or 2, further comprising:
a detailed-key-image extracting step of, with the key-image selecting means, in a case where key images or preceding and following key images are specified through the digest screen, extracting as detailed key images at least two still images from scenes that include the specified key images or preceding and following key images;
a preceding-and-following-detailed-key-image extracting step of extracting at least one still image time-oriented preceding each detailed key image and/or at least one still image time-oriented following each detailed key image with the preceding-and-following-key-image selecting means; and
a detailed-key-image weighting step of assigning weights to the detailed key images on the basis of a predetermined measure with the key-image weighting means,
wherein, in the scene organizing step, with the scene organizing means, the preceding and following detailed key images are disposed in the neighborhood of the corresponding detailed key images while the detailed key images in the scenes are disposed in time-oriented order, and the detailed key images are expanded or contracted according to the corresponding weights to organize a new digest screen, and,
in the screen displaying step, the new digest screen is displayed with the screen displaying means.

4. The method according to claim 3, wherein, in the detailed-key-image weighting step, the key-image weighting means further assigns weights to the individual preceding and following detailed key images on the basis of the predetermined measure, and,
in the scene organizing step, the scene organizing means expands or contracts the preceding and following detailed key images according to the corresponding weights to organize the digest screen.

5. The method according to claim 1, further comprising:
a text defining step of, for the key image and the preceding and following key images or the detailed key images and the preceding and following detailed key images in the individual scenes, defining texts related to the corresponding still images or the scenes that include the corresponding still images with text defining means,
wherein, in the scene organizing step, the texts are expanded or contracted on the basis of a predetermined measure, and then the digest screen is organized with the texts and the corresponding still images.

6. An apparatus for presenting the content of images, in which, out of images that include at least moving images and can be segmented into a plurality of scenes, groups of two or more key images included in the individual scenes are extracted, and a digest screen of the images which includes the groups of key images is organized, the apparatus comprising, at least:
means for inputting the images;
scene segmenting means for segmenting the images into individual scenes;
key-image selecting means for extracting a still image at a point of time, the still image being a key image;
preceding-and-following-key-image selecting means for extracting at least one still image time-oriented preceding the key image and/or at least one still image time-oriented following the key image;
key-image weighting means for assigning a weight to the key image on the basis of a predetermined measure;
scene organizing means for disposing the key images in the individual scenes in time-oriented order, expanding or contracting the key images according to the corresponding weights, and organizing a digest screen on which the preceding and following key images can be disposed in the neighborhood of the corresponding key images; and
screen displaying means for displaying the digest screen.

7. The apparatus for presenting the content of images according to claim 6, wherein the key-image weighting means further assigns weights to the individual preceding and following key images on the basis of the predetermined measure, and
the scene organizing means, according to the corresponding weights, enables or disables the display of the preceding and following key images and expands or contracts the preceding and following key images when the preceding and following key images are to be displayed to organize the digest screen.

8. The apparatus for presenting the content of images according to claim 6 or 7, further comprising:
key-image specifying means for specifying key images or preceding and following key images through the digest screen,
wherein the key-image selecting means extracts as detailed key images at least two still images from scenes that include the specified key images or preceding and following key images,
the preceding-and-following-key-image selecting means extracts at least one still image time-oriented preceding each detailed key image and/or at least one still image time-oriented following each detailed key image,
the key-image weighting means assigns weights to the detailed key images on the basis of a predetermined measure,
the scene organizing means disposes the preceding and following detailed key images in the neighborhood of the corresponding detailed key images while disposing the detailed key images in the scenes in time-oriented order, and expands or contracts the detailed key images according to the corresponding weights to organize a new digest screen, and
the screen displaying means displays the new digest screen.

9. The apparatus for presenting the content of images according to claim 8, wherein the key-image weighting means further assigns weights to the individual preceding and following detailed key images on the basis of the predetermined measure, and
the scene organizing means expands or contracts the preceding and following detailed key images according to the corresponding weights to organize the digest screen.

10. The apparatus for presenting the content of images according to claim 6, further comprising:
text defining means, for the key image and the preceding and following key images or the detailed key images and the preceding and following detailed key images in the individual scenes, for defining texts related to the corresponding still images or the scenes that include the corresponding still images,
wherein the text defining means expands or contracts the texts on the basis of a predetermined measure and then organizes the digest screen with the texts and the corresponding still images.

* * * * *